United States Patent
Oda et al.

(10) Patent No.: US 11,964,402 B2
(45) Date of Patent: Apr. 23, 2024

(54) ROBOT CONTROL SYSTEM, ROBOT CONTROL METHOD, AND CONTROL PROGRAM

(71) Applicant: TOYOTA JIDOSHA KABUSHIKI KAISHA, Toyota (JP)

(72) Inventors: Shiro Oda, Anjo (JP); Tetsuya Taira, Nagakute (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Nagoya (JP); Kyosuke Arai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 95 days.

(21) Appl. No.: 17/524,727

(22) Filed: Nov. 11, 2021

(65) Prior Publication Data

US 2022/0250250 A1 Aug. 11, 2022

(30) Foreign Application Priority Data

Feb. 9, 2021 (JP) .................................. 2021-018735

(51) Int. Cl.
*B25J 9/16* (2006.01)

(52) U.S. Cl.
CPC .................................. *B25J 9/1697* (2013.01)

(58) Field of Classification Search
CPC ...... B25J 9/1697; B25J 9/1694; B25J 9/1656; B25J 9/1628; B25J 9/0003; B25J 13/006; B25J 13/086; B25J 13/088; B25J 13/089; A47L 2201/04; G05D 1/0088; G05D 1/0251; G05D 1/0253; G05D 1/0276; G05D 1/0285; G05D 1/0289; G05D 1/0291; G05D 1/0274

See application file for complete search history.

(56) References Cited

U.S. PATENT DOCUMENTS

| | | | |
|---|---|---|---|
| 10,330,480 | B1 | 6/2019 | Krishnaswamy et al. |
| 2017/0287338 | A1* | 10/2017 | Neubecker .............. H04W 4/46 |
| 2019/0184571 | A1* | 6/2019 | Hou ........................ B25J 5/007 |
| 2019/0304310 | A1 | 10/2019 | Tao et al. |
| 2020/0097740 | A1 | 3/2020 | Hashimoto et al. |
| 2020/0394405 | A1 | 12/2020 | Fukui |

FOREIGN PATENT DOCUMENTS

| | | | |
|---|---|---|---|
| CN | 107264401 A | | 10/2017 |
| CN | 109491392 A | * | 3/2019 |
| CN | 109491392 A | | 3/2019 |

(Continued)

*Primary Examiner* — Khoi H Tran
*Assistant Examiner* — Bryant Tang
(74) *Attorney, Agent, or Firm* — Dickinson Wright, PLLC

(57) ABSTRACT

In a robot control system, the operation of a mobile robot that moves autonomously inside a facility is controlled based at least on an image captured by a photographing device that photographs a blind area located at a blind angle to the mobile robot. When entry of the mobile robot into a predetermined area corresponding to the blind area is detected, the amount of information obtainable from an image captured by the photographing device is increased.

7 Claims, 9 Drawing Sheets

(56) References Cited

FOREIGN PATENT DOCUMENTS

| | | | | |
|---|---|---|---|---|
| CN | 110561416 A | * | 12/2019 | ............ B25J 9/1602 |
| CN | 111619449 A | | 9/2020 | |
| JP | H08237639 A | | 9/1996 | |
| JP | 2005346333 A | | 12/2005 | |
| JP | 2009217350 A | | 9/2009 | |
| JP | 2018093535 A | | 6/2018 | |
| JP | 2018173960 A | | 11/2018 | |
| JP | 2019182402 A | | 10/2019 | |
| JP | 6623341 B2 | | 12/2019 | |
| JP | 6623341 B2 | * | 12/2019 | .............. B60L 53/32 |
| JP | 2020052647 A | | 4/2020 | |
| WO | 2014/091611 A1 | | 6/2014 | |
| WO | 2019/116643 A1 | | 6/2019 | |

* cited by examiner

ROBOT CONTROL SYSTEM, ROBOT CONTROL METHOD, AND CONTROL PROGRAM

CROSS-REFERENCE TO RELATED APPLICATION

This application claims priority to Japanese Patent Application No. 2021-018735 filed on Feb. 9, 2021, incorporated herein by reference in its entirety.

BACKGROUND

1. Technical Field

This disclosure relates to a robot control system, a robot control method, and a control program.

2. Description of Related Art

In recent years, development of a mobile robot that moves autonomously inside a facility, such as a hospital, to perform a task like delivering an article, and a robot control system that controls such a mobile robot has been advanced. Here, the mobile robot is required to move efficiently while avoiding obstacles (including people) inside the facility.

For example, Japanese Unexamined Patent Application Publication No. 8-237639 (JP 8-237639 A) discloses a technology of monitoring a driving status of a vehicle. Specifically, JP 8-237639 A discloses a remote control and monitoring system in which an optimal camera is automatically selected and the monitoring angle and the turning speed of the camera are automatically controlled to obtain an optimal monitor image even without an operator's manual operation. In this remote control and monitoring system, an optimal telephotographic camera is selected and the monitoring angle in the vertical up-down direction, the monitoring angle in the horizontal direction, the monitoring angle changing speed, and the zoom factor are set so as to obtain the best monitor image at all times.

SUMMARY

As described above, the mobile robot is required to move efficiently while avoiding obstacles (including people) inside the facility, particularly obstacles in an area that is located at a blind angle to the mobile robot. Therefore, the robot control system is required to efficiently control the operation of the mobile robot by accurately detecting the presence or absence of an obstacle in an area located at a blind angle to the mobile robot, and the type of the obstacle if present. At the same time, the robot control system is required to reduce the load involved in image analysis as much as possible. Thus, the robot control system is required to efficiently control the operation of the mobile robot without increasing the load involved in image analysis.

This disclosure has been made in view of these circumstances, and an object thereof is to provide a robot control system, a robot control method, and a control program that can efficiently control a mobile robot without increasing the load involved in image analysis.

A robot control system according to an embodiment is a robot control system in which the operation of a mobile robot that moves autonomously inside a facility is controlled based at least on an image captured by a photographing device that photographs a blind area located at a blind angle to the mobile robot, wherein, when entry of the mobile robot into a predetermined area corresponding to the blind area is detected, the amount of information obtainable from an image captured by the photographing device is increased. In this robot control system, when the mobile robot approaches a blind area, the amount of information obtainable from an image captured by the photographing device that photographs the blind area is increased, so that the presence or absence of an obstacle in the blind area, the type of the obstacle if present, etc. can be determined with higher accuracy. Thus, in this robot control system, the moving speed of the mobile robot can be controlled to an appropriate speed corresponding to the obstacle, which enables the mobile robot to move efficiently while avoiding the obstacle. When the mobile robot is not approaching a blind area, it is not necessary to increase the accuracy of determining the presence or absence of an obstacle in the blind area, the type of the obstacle if present, etc. Therefore, in this robot control system, the amount of information obtainable from an image captured by the photographing device that photographs the blind area is not increased in this case to thereby relieve the load involved in image analysis. Thus, this robot control system can efficiently control the mobile robot without increasing the load involved in image analysis.

When entry of the mobile robot into the predetermined area is detected, at least one of the frame rate, the resolution, and the shooting range of photographing by the photographing device may be increased.

When an obstacle in the blind area is detected from an image captured by the photographing device, the moving speed of the mobile robot may be reduced to a speed corresponding to the obstacle.

The photographing device may be a camera that is installed inside the facility.

The photographing device may be a camera that is mounted on a mobile robot other than the mobile robot.

When the mobile robot moves from a first passage into a second passage via a corner or an intersection, the predetermined area may be an area of the first passage that is adjacent to the corner or the intersection, and the blind area may be an area of the second passage that is adjacent to the corner or the intersection.

The robot control system may include a mobile robot that moves autonomously inside a facility, and a control device that controls the mobile robot based at least on an image captured by a photographing device that photographs a blind area located at a blind angle to the mobile robot.

A robot control method according to an embodiment includes the steps of: monitoring whether a mobile robot that moves autonomously inside a facility has entered a predetermined area corresponding to a blind area located at a blind angle to the mobile robot; upon detection of entry of the mobile robot into the predetermined area, increasing the amount of information obtainable from an image captured by a photographing device that photographs the blind area; and controlling the operation of the mobile robot based on the image captured by the photographing device. In this robot control method, when the mobile robot approaches a blind area, the amount of information obtainable from an image captured by the photographing device that photographs the blind area is increased, so that the presence or absence of an obstacle in the blind area, the type of the obstacle if present, etc. can be determined with higher accuracy. Thus, in this robot control method, the moving speed of the mobile robot can be controlled to an appropriate speed corresponding to the obstacle, which enables the mobile robot to move efficiently while avoiding the obstacle. When the mobile robot is not approaching a blind area, it is not necessary to increase the accuracy of determining the presence or absence of an obstacle in the blind area, the type of the obstacle if present, etc. Therefore, in this robot control method, the amount of information obtainable from an image captured by the photographing device that photographs the blind area is not increased in this case to thereby relieve the load involved in image analysis. Thus, this robot control method can efficiently control the mobile robot without increasing the load involved in image analysis.

A control program according to an embodiment causes a computer to execute: a process of monitoring whether a mobile robot that moves autonomously inside a facility has entered a predetermined area corresponding to a blind area located at a blind angle to the mobile robot; a process of, upon detection of entry of the mobile robot into the predetermined area, increasing the amount of information obtainable from an image captured by a photographing device that photographs the blind area; and a process of controlling the operation of the mobile robot based on the image captured by the photographing device. In this control program, when the mobile robot approaches a blind area, the amount of information obtainable from an image captured by the photographing device that photographs the blind area is increased, so that the presence or absence of an obstacle in the blind area, the type of the obstacle if present, etc., can be determined with higher accuracy. Thus, in this control program, the moving speed of the mobile robot can be controlled to an appropriate speed corresponding to the obstacle, which enables the mobile robot to move efficiently while avoiding the obstacle. When the mobile robot is not approaching a blind area, it is not necessary to increase the accuracy of determining the presence or absence of an obstacle in the blind area, the type of the obstacle if present, etc. Therefore, in this control program, the amount of information obtainable from an image captured by the photographing device that photographs the blind area is not increased in this case to thereby relieve the load involved in image analysis. Thus, this control program can efficiently control the mobile robot without increasing the load involved in image analysis.

The present disclosure can provide a robot control system, a robot control method, and a control program that can efficiently control a mobile robot without increasing the load involved in image analysis.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
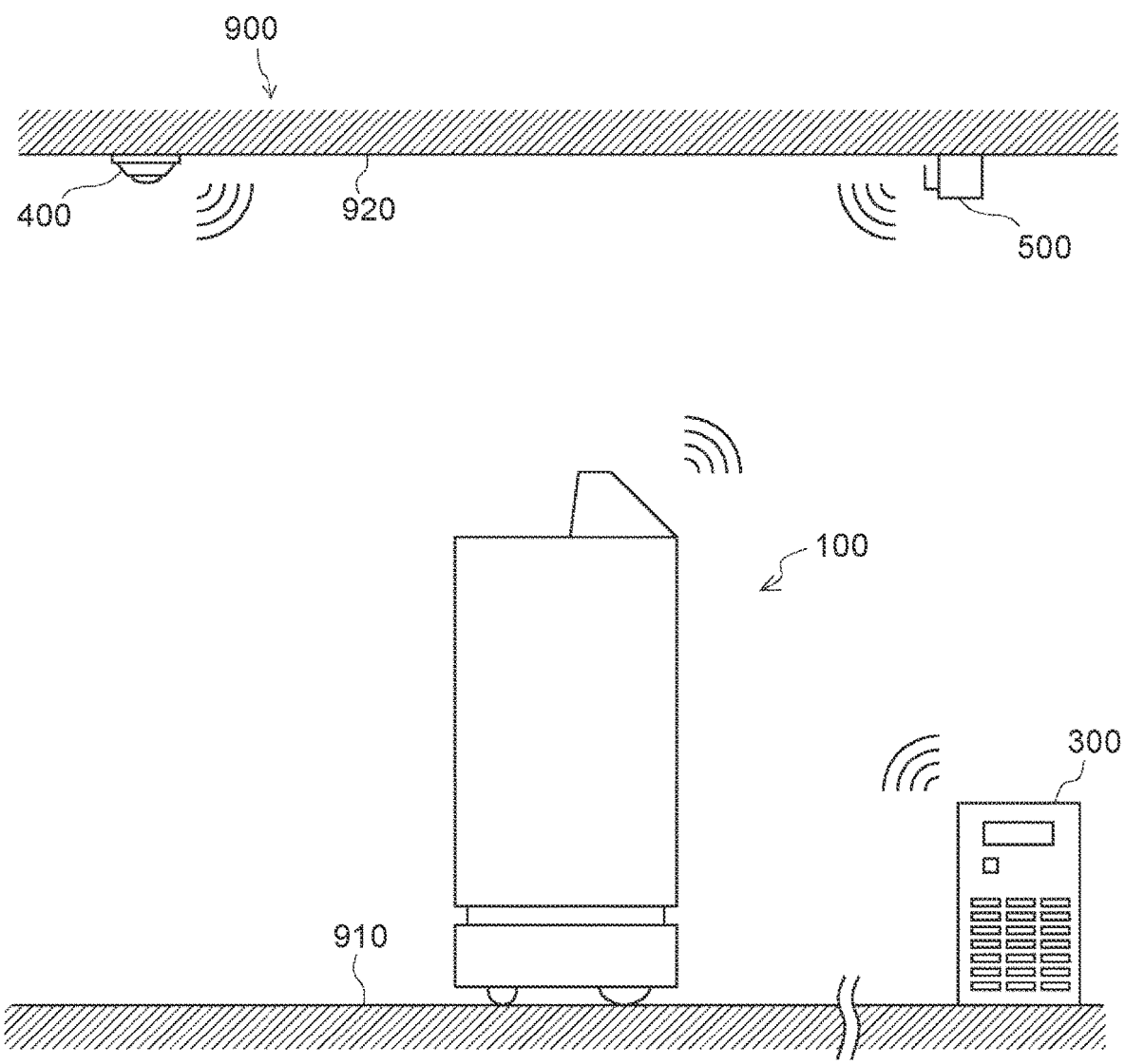
FIG. 1 is a schematic view illustrating a mobile robot that constitutes a robot control system according to Embodiment 1.

The present disclosure will be described below through embodiments of the disclosure, but it is not intended to limit the disclosure according to the claims to the following embodiments. Further, not all the components described in the embodiments are essential as means for achieving the object. To clarify the description, the following text and the drawings are partially omitted and simplified as necessary. The same elements in the drawings are denoted by the same reference signs, and an overlapping description thereof will be omitted as necessary.

Embodiment 1

In the following, a robot control system according to Embodiment 1 will be described.

The robot control system is a system that controls a mobile robot configured to be able to move autonomously inside a predetermined facility. The robot control system may be a single mobile robot, or may include one or more mobile robots and a server device (control device) that manages (controls) the mobile robots. The term "mobile robot" covers a delivery robot that moves autonomously to deliver an article. In this embodiment, a case where the robot control system is a single mobile robot will be described.

Configuration of Mobile Robot

FIG. 1 is a schematic view illustrating a mobile robot according to Embodiment 1. As shown in FIG. 1, a mobile robot 100 is configured to be able to move autonomously inside a predetermined facility 900. The predetermined facility 900 is, for example, a hospital. However, the predetermined facility 900 is not limited to a hospital but may be any facility where the mobile robot 100 can move autonomously, such as a hotel or a shopping mall. In this embodiment, the case where the predetermined facility 900 is a hospital will be described as an example.

The mobile robot 100 moves autonomously on a floor surface 910 inside the facility 900. A facility camera 400 is fixed inside the facility 900. For example, the facility camera 400 is fixed on a ceiling 920 of the facility 900 and creates image data by imaging the surroundings of the facility camera 400. A plurality of facility cameras 400 may be provided inside the facility 900.

The facility camera 400 may be installed so as to be able to photograph an area around a corner or an intersection. In this case, the facility camera 400 can photograph an area (blind area) located at a blind angle to the mobile robot 100 that is about to enter the corner or the intersection. This captured image is sent to the mobile robot 100. When an obstacle in an area located at a blind angle to the mobile robot 100 is determined from the captured image, for example, the mobile robot 100 can stop temporarily or decelerate before entering the blind area.

The mobile robot 100 and the facility camera 400 are connected to each other so as to be able to communicate through information transmission means, such as wireless communication. For example, the mobile robot 100 and the facility camera 400 may be connected to each other so as to be able to communicate directly, or may be connected to each other so as to be able to communicate through an access point 500 and a server device 300. The mobile robot 100 acquires image data from the facility camera 400, directly or through the access point 500 and the server device 300.

The access point 500 is, for example, a wireless LAN access point. The access point 500 is fixed inside the facility 900 and acquires, from the mobile robot 100 located around the access point 500, position information, travel information, etc. on the mobile robot 100. A plurality of access points 500 may be provided inside the facility 900.

A plurality of mobile robots 100 may move autonomously inside the facility 900. When a plurality of mobile robots 100 moves autonomously, these mobile robots 100 may be connected to one another so as to be able to communicate through information transmission means, such as wireless communication. The mobile robots 100 may be connected to one another so as to be able to communicate directly, or may be connected to one another so as to be able to communicate through the access point 500 and the server device 300.

Figure 2:
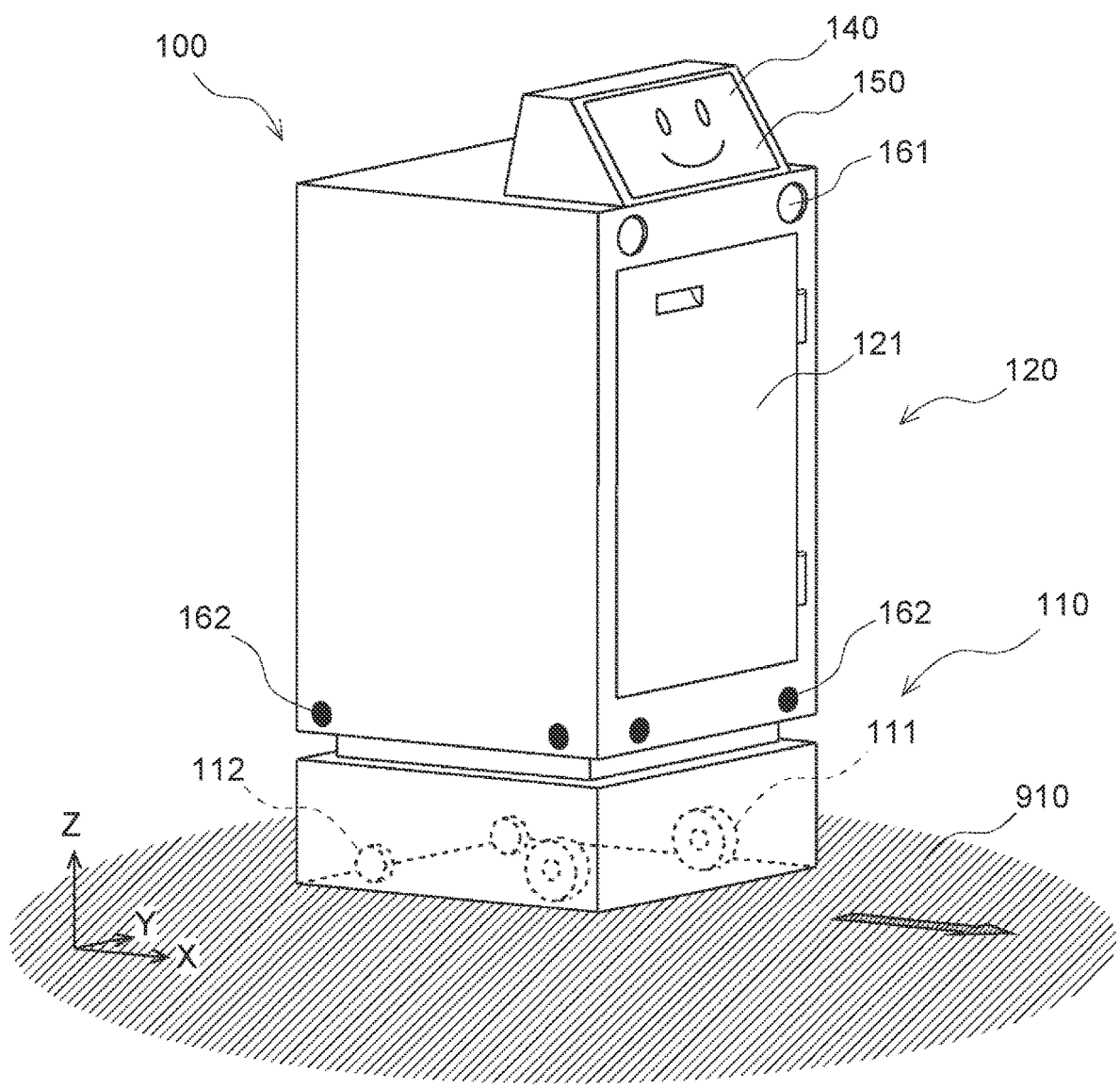
FIG. 2 is a perspective view illustrating the mobile robot according to Embodiment 1.
Figure 3:
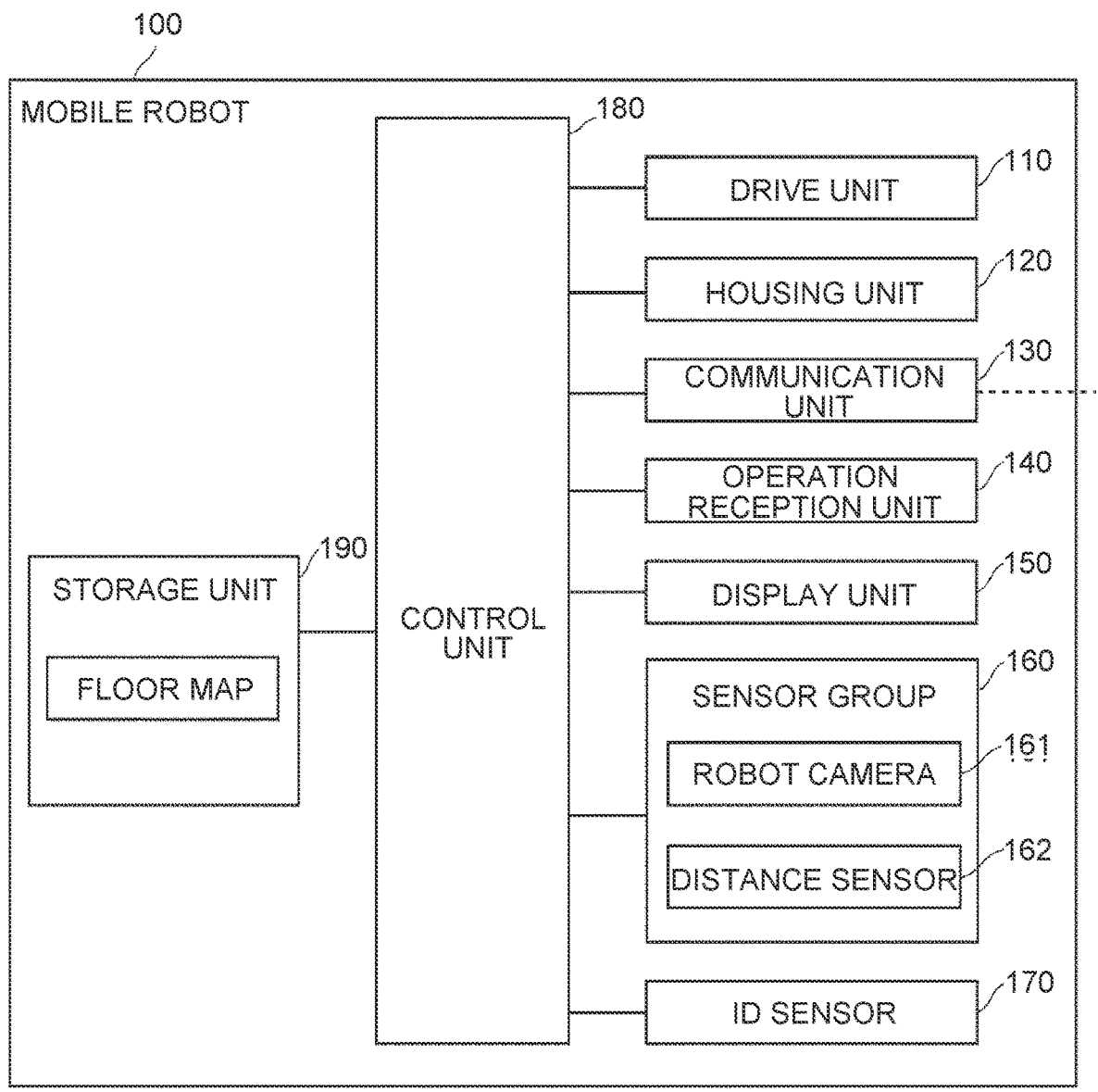
FIG. 3 is a block diagram illustrating the mobile robot according to Embodiment 1.

FIG. 2 is a perspective view illustrating the mobile robot 100 according to Embodiment 1. FIG. 3 is a block diagram illustrating the mobile robot 100 according to Embodiment 1. As shown in FIG. 2 and FIG. 3, the mobile robot 100 includes a drive unit 110, a housing unit 120, a communication unit 130, an operation reception unit 140, a display unit 150, a sensor group 160, an ID sensor 170, a control unit 180, and a storage unit 190.

As shown in FIG. 2, the mobile robot 100 is a movable body that moves on the floor surface 910 constituting a motion surface. Here, for the convenience of describing the mobile robot 100, an XYZ orthogonal coordinate system is used. The floor surface 910 is defined as an XY-plane, and an upward direction is defined as a +Z-axis direction.

The drive unit 110 functions as moving means of the mobile robot 100. The drive unit 110 has two drive wheels 111 that are in contact with the floor surface 910 and set to be able to rotate independently of each other around one rotating shaft extending in a direction (a left-right direction or a Y-axis direction in FIG. 2) at a right angle to a direction of straight motion (a front-rear direction or an X-axis direction in FIG. 2), and casters 112 that are in contact with the floor surface. The mobile robot 100 moves forward or backward by driving the drive wheels 111, disposed on left and right sides, at the same rotation speed, and turns by causing a difference in rotation speed or rotation direction between the left and right drive wheels 111. The drive unit 110 drives the drive wheels 111 in accordance with a command from the control unit 180.

The housing unit 120 is disposed on an upper side of the drive unit 110 in the mobile robot 100. The housing unit 120 may have a storage door 121. Opening the storage door 121 reveals a storage that is provided inside the housing unit 120 to store a predetermined article to be delivered. Therefore, the mobile robot 100 can serve as a delivery robot that delivers a predetermined article. The housing unit 120 may open and close the storage door 121 in accordance with a command from the control unit 180.

As shown in FIG. 3, the communication unit 130 is an interface that communicably connects to an outside. For example, the communication unit 130 includes an antenna and a circuit that modulates or demodulates signals to be sent through the antenna. The communication unit 130 receives image data from the facility camera 400, directly or through the access point 500 and the server device 300.

The communication unit 130 may receive information about a destination, information about whether motion is possible, etc. from the server device 300. The communication unit 130 may send information about a state of the mobile robot 100, position information, travel information, etc. to the server device 300. In addition, the communication unit 130 may send and receive position information and image data to and from other mobile robots 100, directly or through the access point 500 and the server device 300.

The communication unit 130 may send a heartbeat signal to the server device 300 at regular intervals. The heartbeat signal may include log data showing the state of the mobile robot 100 in chronological order. The heartbeat signal may include an identification (ID) of the mobile robot 100 and an ID of a user who operates the mobile robot 100.

The communication unit 130 connects to the control unit 180 and outputs signals including information sent from the facility camera 400 and the server device 300 to the control unit 180, and sends signals output from the control unit 180 to the server device 300.

The operation reception unit 140 receives an input operation from the user and sends an operation signal to the control unit 180. As means for receiving an input operation from the user, the operation reception unit 140 may have, for example, operation buttons or a touch panel that is superimposed on the display unit 150. By operating such input operation means, the user performs operations such as turning the power on and off and opening and closing the storage door 121.

The display unit 150 is provided, for example, on an upper surface of the housing unit 120 so as to protrude. The display unit 150 is, for example, a display unit including a rectangular liquid crystal panel. The display unit 150 displays information as necessary in accordance with a command from the control unit 180. A touch panel for receiving an operation from the user may be superimposed on the display unit 150.

The sensor group 160 includes sensors that acquire data required for the mobile robot 100 to move autonomously. The sensor group 160 includes, for example, robot cameras 161 and distance sensors 162. The sensor group 160 may include sensors other than the robot cameras 161 and the distance sensors 162.

The robot cameras 161 are disposed, for example, at an upper part of the housing unit 120, under the display unit 150. The robot cameras 161 may be two camera units with the same angle of view that are disposed apart from each other in a horizontal direction. Images captured by each camera unit are output to the control unit 180 as image data.

When the mobile robot 100 is moving near a corner of a passage or an intersection of passages, the robot cameras 161 may photograph an area near the corner of the passage or the intersection of the passages. The robot cameras 161 can photograph an area located at a blind angle to another mobile robot 100 that is about to enter the corner or the intersection. This captured image is sent to that other mobile robot 100. When an obstacle in the area located at a blind angle to that other mobile robot 100 is determined from this captured image, that other mobile robot 100 can stop temporarily or decelerate before entering the blind area.

The distance sensors 162 are disposed, for example, at a lower part of the housing unit 120. The distance sensors 162 may be disposed at a lower part of each of a surface of the housing unit 120 facing a +X-axis direction, a surface thereof facing a −X-axis direction, a surface thereof facing a +Y-axis direction, and a surface thereof facing a −Y-axis direction. The distance sensors 162 measure the distance to an object around the mobile robot 100. The control unit 180 recognizes an obstacle around the mobile robot 100 and measures the distance between the mobile robot 100 and the obstacle by analyzing image data output from the robot cameras 161 and detection signals output from the distance sensors 162.

The ID sensor 170 is provided, for example, in the vicinity of the display unit 150. The ID sensor 170 serves to identify the ID of the user who operates the mobile robot 100, and detects a unique identifier included in an ID card that each user carries. For example, the ID sensor 170 includes an antenna for reading information in a wireless tag. The user who is the operator of the mobile robot 100 brings his or her ID card close to the ID sensor 170 to thereby have his or her ID recognized.

The control unit 180 is an information processing device having an arithmetic unit, such as a central processing unit (CPU). The control unit 180 includes hardware belonging to the control unit 180 and programs stored in the hardware. That is, processes executed by the control unit 180 are realized by either hardware or software.

The control unit 180 acquires various pieces of information from relevant components and gives commands to the relevant components according to the acquired information. For example, the control unit 180 detects the distance between the mobile robot 100 and an object around the mobile robot 100 from image data acquired from the facility camera 400 and the robot cameras 161, information on the object around the mobile robot 100 acquired from the distance sensors 162, etc. The control unit 180 calculates a route to a destination based on the detected distance, the position information, etc. Then, the control unit 180 gives a command to the drive unit 110 to move the mobile robot 100 along the calculated route. When executing this process, the control unit 180 refers to information about a floor map stored in the storage unit 190.

Further, the control unit 180 may determine whether there is an obstacle in an area located at a blind angle to the mobile robot 100 that is about to enter a corner of a passage or an intersection of passages, and the type of the obstacle if present, based on the image data acquired from the facility camera 400 that photographs an area near the corner or the intersection (or the robot cameras mounted on another mobile robot that photograph an area near the corner of the passage or the intersection of the passages).

Here, upon detection of entry of the mobile robot 100 into a predetermined area located short of the corner of the passage or the intersection of the passages (a predetermined area adjacent to the corner or the intersection), the control unit 180 increases the amount of information obtainable from a captured image of the area located at a blind angle to the mobile robot 100.

Specifically, the control unit 180 increases at least one of the frame rate, the resolution, and the shooting range of photographing by the facility camera 400 that photographs an area near the corner of the passage or the intersection of the passages (or the robot cameras mounted on another mobile robot that photograph an area near the corner of the passage or the intersection of the passages). Thus, the control unit 180 can more accurately determine the presence or absence of an obstacle in the blind area and the type of the obstacle if present.

Upon detection of an obstacle in the blind area, the control unit 180 reduces the moving speed of the mobile robot 100 to a speed corresponding to the obstacle. For example, upon detection of a patient using a cane or a patient in a wheelchair in the blind area, the control unit 180 may reduce the moving speed of the mobile robot 100 to a very low speed or temporarily stop the mobile robot 100. Upon detection of another mobile robot 100 in the blind area, the control unit 180 may decelerate the mobile robot 100 to a lesser extent than upon detection of a patient using a cane, because both the mobile robots 100 can grasp the positional relationship with each other. When no obstacle is detected in the blind area, the control unit 180 may maintain the moving speed of the mobile robot 100 at the current speed.

The storage unit 190 includes a non-volatile memory, such as a flash memory or a solid-state drive (SSD). The storage unit 190 stores a floor map of the facility used for the mobile robot 100 to move autonomously. The storage unit 190 is connected to the control unit 180 and outputs information stored therein to the control unit 180 upon request from the control unit 180.

As shown in FIG. 2, the side of the mobile robot 100 facing the +X-axis direction where the robot cameras 161 are installed is defined as the front side of the mobile robot 100. Thus, during normal motion, the +X-axis direction is an advancing direction as indicated by the arrow.

Various ideas can be adopted as to how to define the front side of the mobile robot 100. For example, the front side of the mobile robot 100 can be defined based on how the sensor group 160 for recognizing the surrounding environment is disposed. Specifically, one side of the housing unit 120 of the mobile robot 100 where a sensor with higher recognition performance is disposed or many sensors are disposed may be defined as the front side of the mobile robot 100. Thus defining the front side of the mobile robot 100 allows the mobile robot 100 to move while more appropriately recognizing the surrounding environment. Also for the mobile robot 100 in the embodiment, the side facing the +X-axis direction where the robot cameras 161 are disposed is defined as the front side.

Alternatively, the front side can be defined based on how the display unit 150 is disposed. If the display unit 150 displays a character's face or the like, people around the mobile robot 100 can naturally recognize that the display unit 150 forms the front side of the mobile robot 100. Therefore, defining the side of the display surface of the display unit 150 as the front side of the mobile robot 100 lessens a sense of strangeness given to people around it. Also for the mobile robot 100 in the embodiment, the side of the display surface of the display unit 150 is defined as the front side.

Further, the front side of the mobile robot 100 may be defined based on the shape of the housing of the housing unit 120. For example, when the shape of the housing unit 120 projected onto a travel surface is a rectangular shape, defining the short side as the front side is less likely to cause the mobile robot 100 to get in the way of passersby while moving than defining the long side as the front side. Thus, depending on the shape of the housing, there is a housing surface that is preferably located on the front side during normal motion. Also for the mobile robot 100 in the embodiment, the short side of the rectangular shape is defined as the front side. While the front side of the mobile robot 100 is defined in line with some ideas as has been described above, which idea to use as a basis for defining the front side should be determined with the shape, the role, etc. of a given mobile robot taken into account.

Operation of Mobile Robot

Next, the operation of the mobile robot of the embodiment will be described. For example, the user turns the power to the mobile robot 100 on. Then, the user inputs a desired task into the operation reception unit 140. When turning the power on or operating by the operation reception unit 140, the user has his or her ID identified by the ID sensor 170 if necessary.

To have an article delivered as a desired task, the user operates the operation reception unit 140 to open the storage door 121 and stores the article in the storage. Then, the user operates the operation reception unit 140 to close the storage door 121.

Next, the user inputs a destination of delivery of the article through the operation reception unit 140. Then, the control unit 180 of the mobile robot 100 searches for a route from an origin of delivery to the destination of delivery using the floor map stored in the storage unit 190. The mobile robot 100 delivers the article along the route derived from the floor map while avoiding obstacles such as installations and people.

Figure 4:
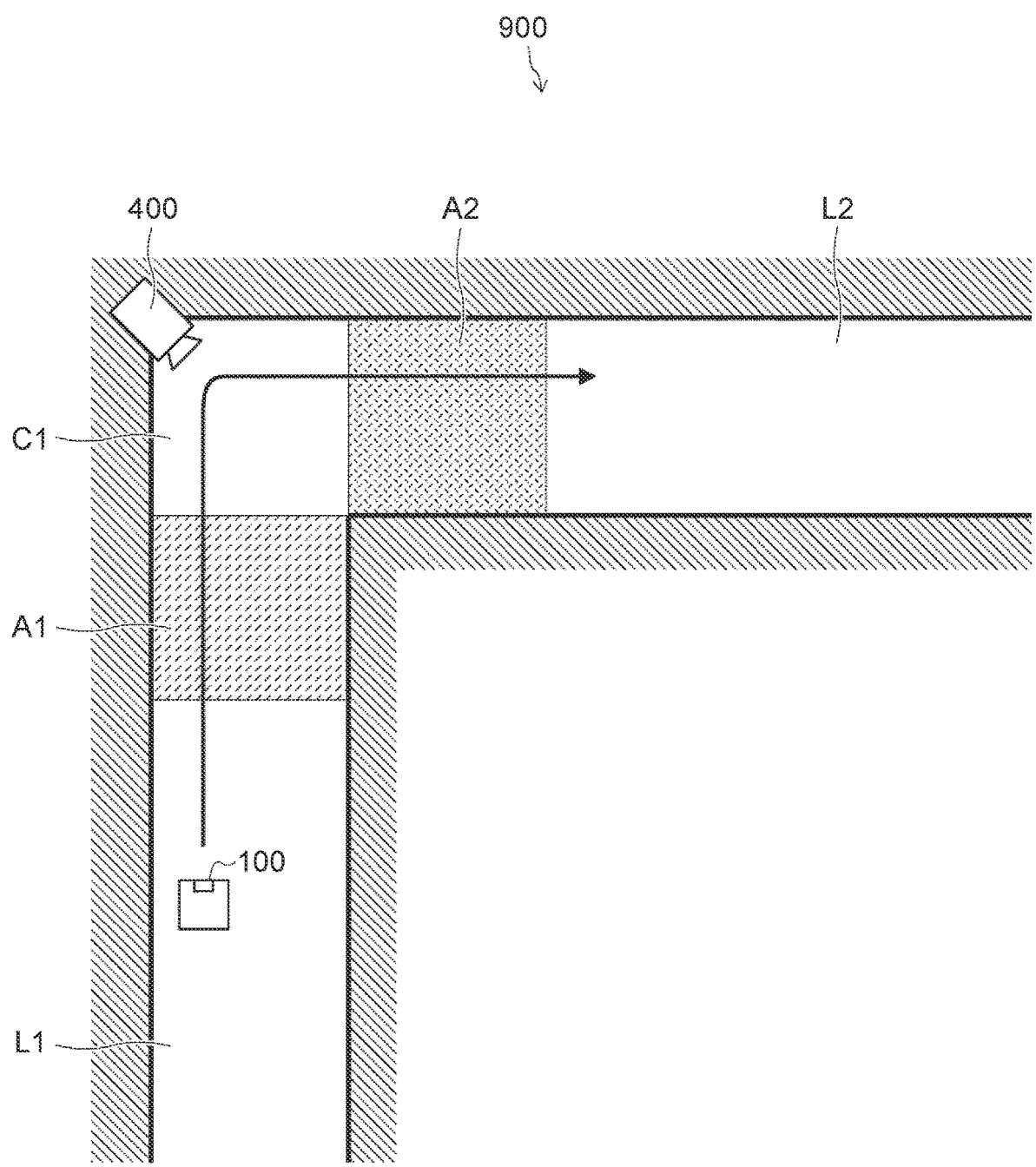
FIG. 4 is a schematic plan view illustrating a motion of the mobile robot according to Embodiment 1 at a corner inside a facility.

FIG. 4 is a schematic plan view illustrating a motion of the mobile robot 100 at a corner inside the facility. In the example of FIG. 4, a passage L1, a passage L2, and a corner C1 connecting the passages L1, L2 to each other are provided inside the hospital facility 900. On the ceiling at the corner C1, the facility camera 400 that photographs an area near the corner C1 (including areas A1, A2 to be described later) is installed. In the example of FIG. 4, the mobile robot 100 is moving from the passage L1 into the passage L2 via the corner C1.

Figure 5:
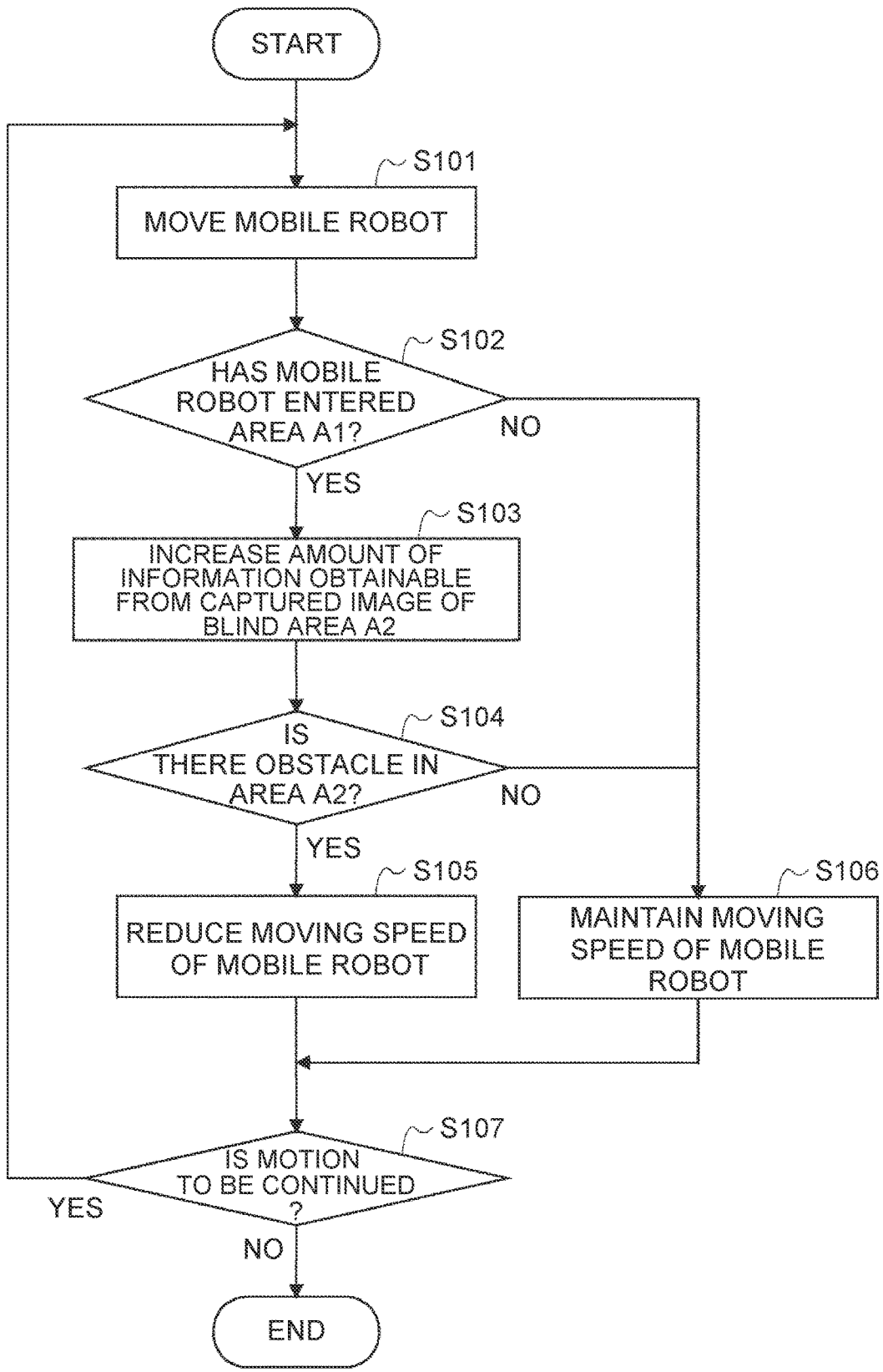
FIG. 5 is a flowchart showing one example of the operation of the mobile robot according to Embodiment 1.

FIG. 5 is a flowchart showing one example of the operation of the mobile robot 100 inside the hospital shown in FIG. 4. In the example of FIG. 5, a case where the mobile robot 100 moves from the passage L1 into the passage L2 via the corner C1 will be described.

First, the mobile robot 100 starts to move through the passage L1 (step S101).

While moving through the passage L1, as long as there is no obstacle etc., the mobile robot 100 maintains the moving speed at a fixed speed until reaching the predetermined area A1 located short of the corner C1 (the predetermined area A1 located on the side of the passage L1, adjacent to the corner C1) ("NO" in step S102 to S106 to "YES" in S107 to S101).

Thereafter, when the mobile robot 100 enters the predetermined area A1 located short of the corner C1 ("YES" in step S102), the mobile robot 100 increases the amount of information obtainable from an image captured by the facility camera 400 that photographs the area A2 located at a blind angle to the mobile robot 100 (the predetermined area A2 located on the side of the passage L2, adjacent to the corner C1) (step S103).

Specifically, the mobile robot 100 increases at least one of the frame rate, the resolution, and the shooting range of photographing by the facility camera 400 that photographs the blind area A2. Thus, the mobile robot 100 can more accurately determine the presence or absence of an obstacle in the blind area A2 and the type of the obstacle if present.

In this example, the case where the facility camera 400 photographs the areas A1, A2 is being described. However, this disclosure is not limited to this case, and two facility cameras 400 may respectively photograph the areas A1, A2, or the robot cameras mounted on another mobile robot may photograph the areas A1, A2.

Figure 6:
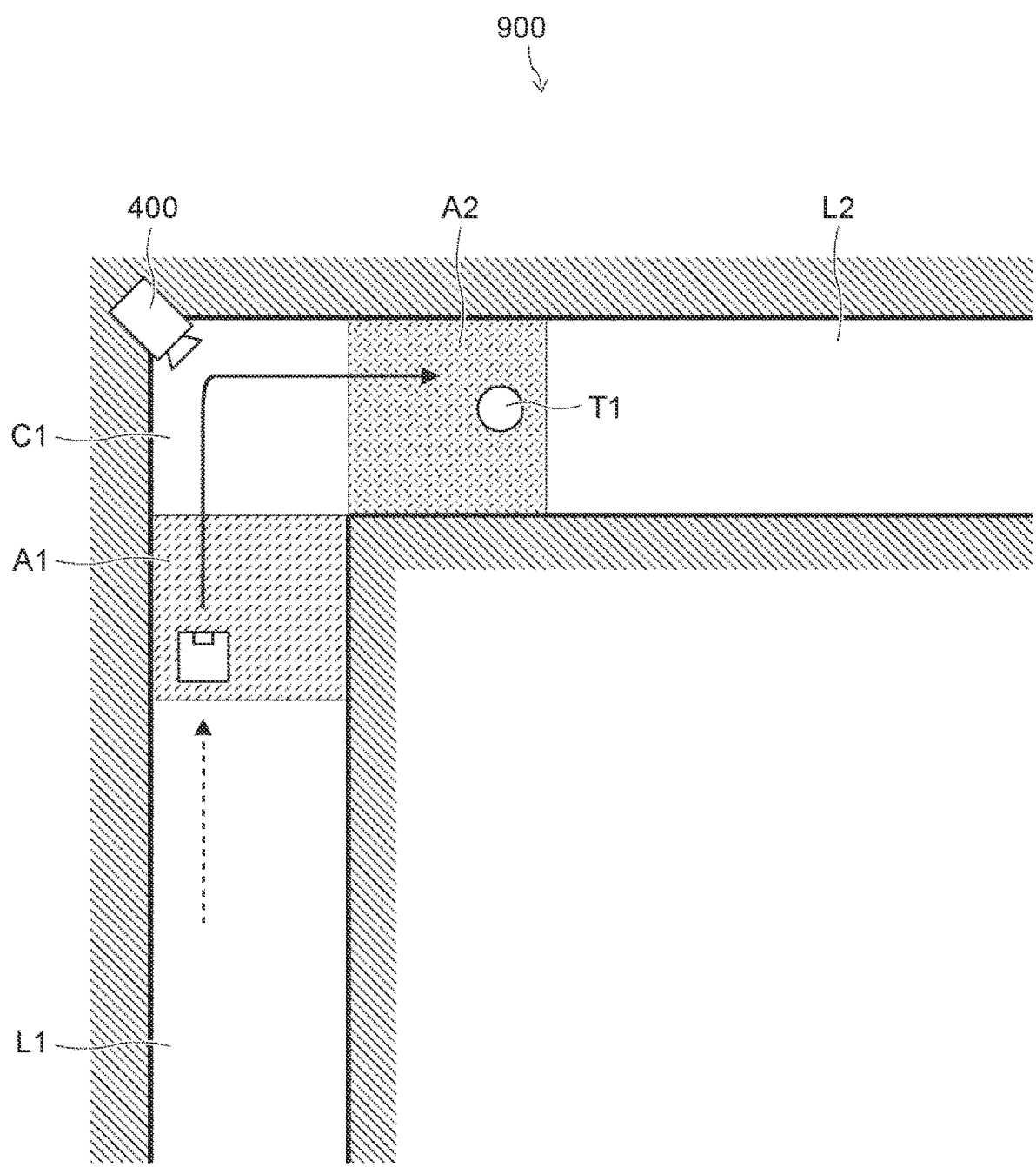
FIG. 6 is a schematic plan view illustrating a motion of the mobile robot according to Embodiment 1 at the corner inside the facility.

Here, as illustrated in FIG. 6, when an obstacle T1 is detected in the blind area A2 ("YES" in step S104), the mobile robot 100 reduces its moving speed to a speed corresponding to the obstacle T1 (step S105). Thus, the mobile robot 100 can move efficiently so as to avoid the obstacle T1.

When no obstacle is detected in the blind area A2 ("NO" in step S104), the mobile robot 100 maintains its moving speed at the current speed (step S106). However, the mobile robot 100 may decelerate to such an extent as to be able to safely turn around the corner C1.

Thereafter, the mobile robot 100 turns around the corner C1 and moves into the passage L2. When motion of the mobile robot 100 is to be continued after that ("YES" in step S107), the process from step S101 to step S107 is repeated, and when motion of the mobile robot 100 is not to be continued ("NO" in step S107), the operation of the mobile robot 100 ends.

In this way, when the mobile robot according to this embodiment approaches a blind area, the amount of information obtainable from an image captured by the photographing device (the facility camera or the robot cameras) that photographs the blind area is increased, so that the presence or absence of an obstacle in the blind area, the type of the obstacle if present, etc. can be determined with higher accuracy. As a result, the mobile robot according to this embodiment can control its moving speed to an appropriate speed corresponding to the obstacle and thereby move efficiently while avoiding the obstacle.

When the mobile robot according to this embodiment is not approaching a blind area, it is not necessary to increase the accuracy of determining the presence or absence of an obstacle in the blind area, the type of the obstacle if present, etc. In this case, therefore, the amount of information obtainable from an image captured by the photographing device that photographs the blind area is not increased to thereby relieve the load involved in image analysis.

Thus, the mobile robot according to this embodiment can efficiently control its moving speed without increasing the load involved in image analysis.

In this example, the case has been described in which, when the mobile robot 100 has entered the predetermined area A1 while moving from the passage L1 into the passage L2 via the corner C1, the amount of information obtainable from a captured image of the predetermined area A2 located at a blind angle to the mobile robot 100 is increased. However, this disclosure is not limited to this case. For example, when the mobile robot 100 has entered the predetermined area A2 while moving from the passage L2 into the passage L1 via the corner C1, the amount of information obtainable from a captured image of the predetermined area A1 located at a blind angle to the mobile robot 100 may be increased.

In this embodiment, the case where the mobile robot 100 moves around a corner has been described, but this disclosure is not limited to this case. In the case where the mobile robot 100 moves through some place where there can be an area located at a blind angle to the mobile robot 100, being able to acquire a captured image of that area located at a blind angle can produce effects equivalent to those in the case where the mobile robot 100 moves around a corner. In the following, a case where the mobile robot 100 moves across an intersection will be described using FIG. 7.

Figure 7:
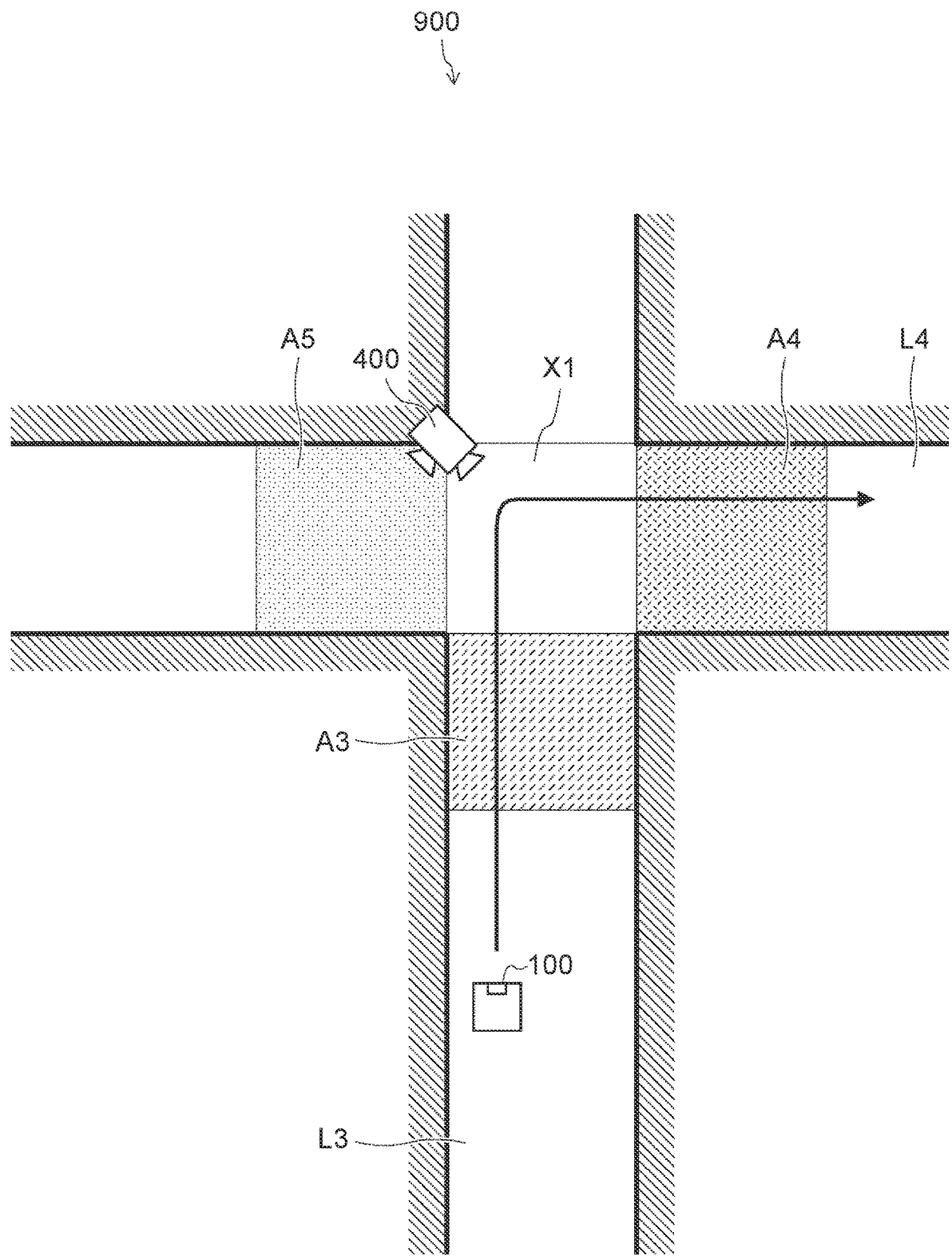
FIG. 7 is a schematic plan view illustrating a motion of the mobile robot according to Embodiment 1 at an intersection inside the facility.

FIG. 7 is a schematic plan view illustrating a motion of the mobile robot 100 at an intersection inside the facility. In the example of FIG. 7, a passage L3, a passage L4, and an intersection X1 at which the passages L3, L4 intersect each other are provided inside the hospital facility 900. On the ceiling at the intersection X1, the facility camera 400 that photographs an area around the intersection X1 (including areas A3, A4, A5 to be described later) is installed. In the example of FIG. 7, the mobile robot 100 is moving from the passage L3 into the passage L4 via the intersection X1.

While moving through the passage L3, as long as there is no obstacle etc., the mobile robot 100 maintains the moving speed at a fixed speed until reaching the predetermined area A3 located short of the intersection X1 (the predetermined area A3 located on the side of the passage L3, adjacent to the intersection X1).

Thereafter, when the mobile robot 100 enters the predetermined area A3 located short of the intersection X1, the amount of information obtainable from an image captured by the facility camera 400 that photographs the areas A4, A5 located at blind angles to the mobile robot 100 (the predetermined areas A4, A5 on the side of the passage L4, adjacent to the intersection X1) is increased. (For example, the frame rate, the resolution, or the shooting range is increased.) Thus, the mobile robot 100 can more accurately determine the presence or absence of an obstacle in the blind areas A4, A5 and the type of the obstacle if present.

Here, for example, when an obstacle is detected in the blind area A4, the mobile robot 100 reduces its moving speed to a speed corresponding to the obstacle. Thus, the mobile robot 100 can move efficiently so as to avoid the obstacle.

The operation of the mobile robot 100 at the intersection X1 is otherwise the same as the operation of the mobile robot 100 at the corner C1 and therefore will not be further described.

Embodiment 2

Next, a robot control system according to Embodiment 2 will be described. In this embodiment, a case where the robot control system includes one or more mobile robots and a server device (control device) that manages (controls) these mobile robots will be described.

Specifically, the robot control system includes one or more mobile robots 100 and a server device 300. The configuration of the mobile robot 100 is the same as the configuration described in Embodiment 1 and therefore the description thereof will be omitted.

The mobile robot 100 according to this embodiment may be such that some of the functions of the mobile robot 100 according to Embodiment 1 are fulfilled by the server device 300. For example, the server device 300 may be configured to acquire images captured by the facility camera and the robot cameras, to control the amount of information obtainable from the captured images of a blind area photographed by the facility camera and the robot cameras, to perform image analysis, and to control the motion of one or more mobile robots 100 according to the result of the image analysis.

The server device 300 is, for example, a computer having a communication function. The server device 300 may be installed at any place where it can communicate with relevant components of the robot control system. The server device 300 sends and receives position information, travel information, etc. on the mobile robot 100.

Figure 8:
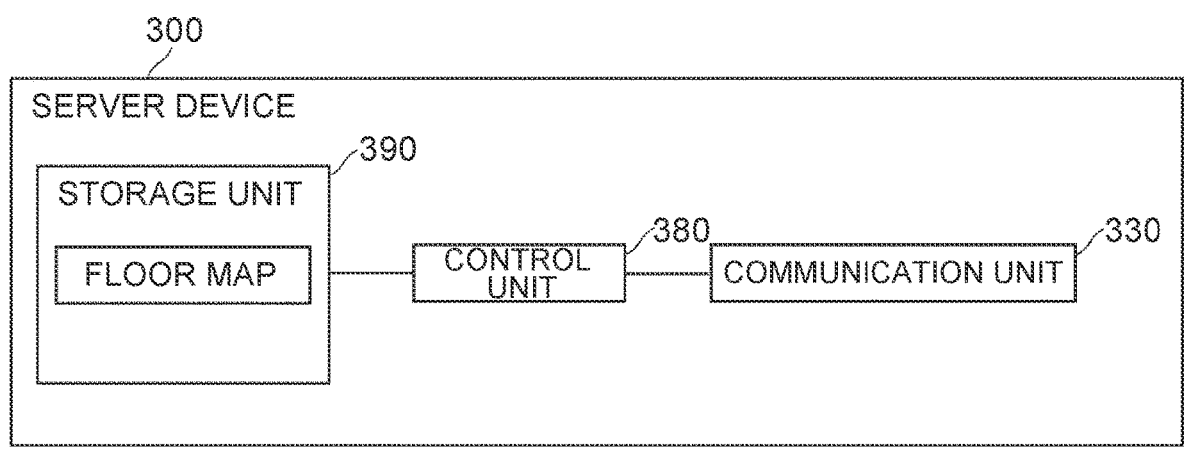
FIG. 8 is a block diagram illustrating a server device provided in a robot control system according to Embodiment 2.

FIG. 8 is a block diagram illustrating the server device provided in the robot control system according to Embodiment 2. As shown in FIG. 8, the server device 300 has a communication unit 330, a control unit 380, and a storage unit 390.

The communication unit 330 individually communicates with each mobile robot 100. The communication unit 330 outputs signals received from relevant components to the control unit 380. The communication unit 330 sends signals output from the control unit 380 to the relevant components as necessary. The communication unit 330 may include a router device to allow communication between the server device 300 and a plurality of components. To allow communication between the server device 300 and the components, the communication unit 330 may have different communication means for each different constituent element to communicate with. The communication unit 330 may be connected to the components so as to be able to communicate with them through intranet lines or Internet lines.

The control unit 380 includes an arithmetic unit, such as a CPU, as a component and performs various types of information processing. The control unit 380 may be configured to acquire images captured by the facility camera and the robot cameras, to control the amount of information obtainable from captured images of a blind area photographed by the facility camera and the robot cameras, to perform image analysis, and to control the motion of one or more mobile robots 100 according to the result of the image analysis.

The storage unit 390 includes a non-volatile memory, such as a flash memory or an SSD. The storage unit 390 stores a floor map of the facility used for the mobile robot 100 to move autonomously. The storage unit 390 is connected to the control unit 380 and outputs information stored therein to the control unit 380 upon request from the control unit 380.

Figure 9:
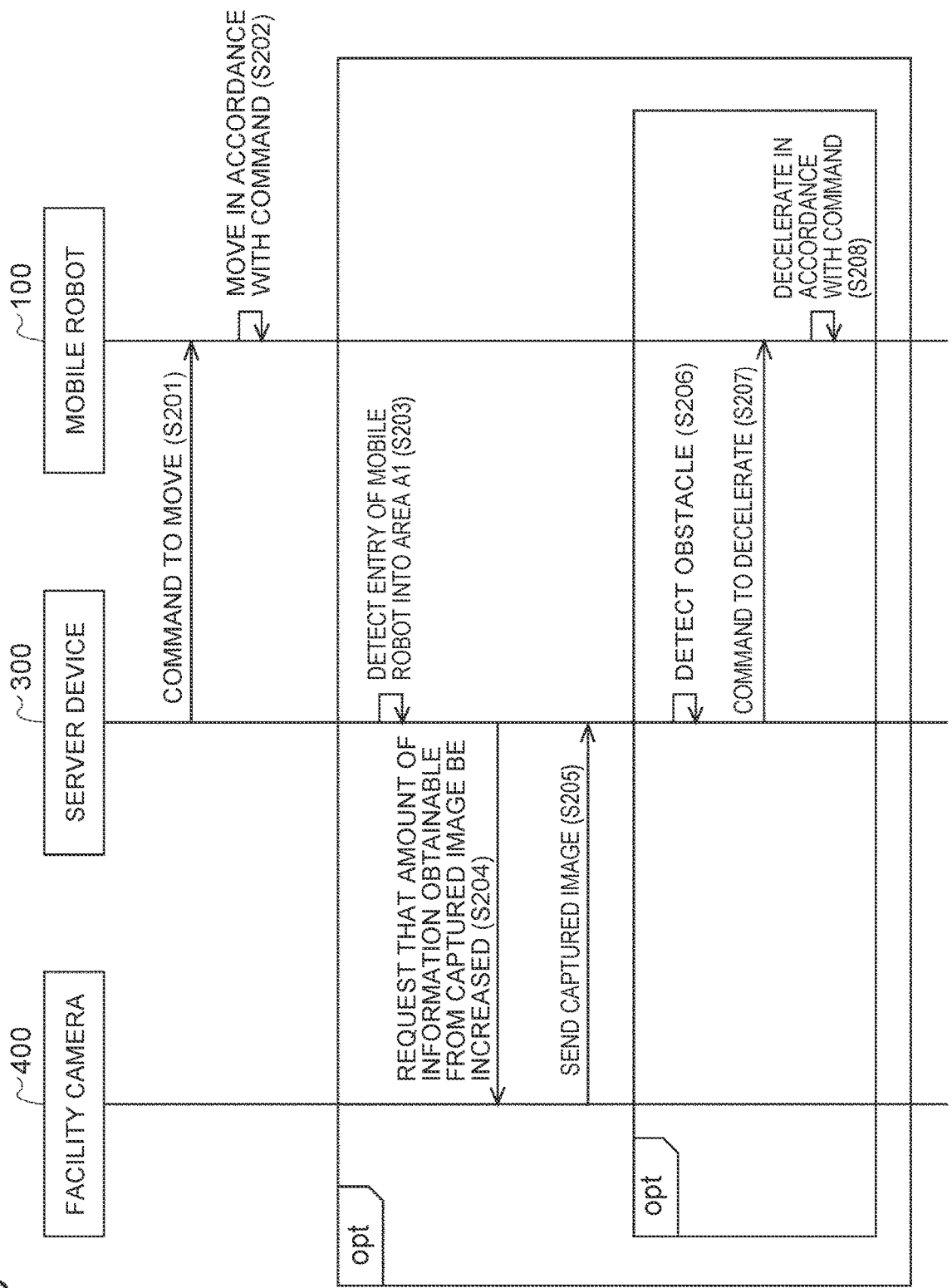
FIG. 9 is a sequence chart illustrating the operation of the robot control system according to Embodiment 2.

FIG. 9 is a sequence chart illustrating the operation of the robot control system according to Embodiment 2. In the example of FIG. 9, a case where the server device 300 controls the moving speed of one mobile robot 100 will be described. However, this disclosure is not limited to this case, and the server device 300 may control the moving speeds of a plurality of mobile robots 100.

As shown in FIG. 9, the server device 300 commands the mobile robot 100 to move (step S201). For example, the server device 300 commands the mobile robot 100 to deliver an article to a destination. In this case, the server device 300 searches for a route from the current position of the mobile robot 100 to the destination of delivery of the article, and a route from the origin of delivery of the article to the destination (destination of delivery), and sends information on the established routes to the mobile robot 100. It is assumed that the established routes include a route that passes through the corner C1 as shown in FIG. 4.

Then, the mobile robot 100 moves in accordance with the command from the server device 300 (step S202). For example, the mobile robot 100 moves from the current position to the origin of delivery of the article along the specified route, and after receiving the article, delivers the article to the destination along the specified route.

Here, when the server device 300 detects entry of the mobile robot 100 into the predetermined area A1 located short of the corner C1 (step S203), the server device 300 increases the amount of information obtainable from an image captured by the facility camera 400 that photographs the area A2 that is located at a blind angle to the mobile robot 100 (e.g., increases the frame rate, the resolution, or the shooting range) (step S204). Then, the facility camera 400 sends to the server device 300 a captured image in which, for example, at least one of the frame rate, the resolution, and the shooting range is increased (step S205). As a result, the server device 300 can more accurately determine the presence or absence of an obstacle in the blind area A2 and the type of the obstacle if present.

For example, when an obstacle is detected in the blind area A2 (step S206), the server device 300 commands the mobile robot 100 to reduce its moving speed to a speed corresponding to the obstacle (step S207). Then, the mobile robot 100 decelerates in accordance with the command from the server device 300 (step S208). As a result, the mobile robot 100 can move efficiently so as to avoid the obstacle.

In this way, in the robot control system according to this embodiment, when the mobile robot approaches a blind area, the amount of information obtainable from an image captured by the photographing device (the facility camera or the robot cameras) that photographs the blind area is increased, so that the presence or absence of an obstacle in the blind area, the type of the obstacle if present, etc., can be determined with higher accuracy. Thus, in the robot control system according to this embodiment, the moving speed of the mobile robot can be controlled to an appropriate speed corresponding to the obstacle, which enables the mobile robot to move efficiently while avoiding the obstacle.

When the mobile robot is not approaching a blind area, it is not necessary to increase the accuracy of determining the presence or absence of an obstacle in the blind area, the type of the obstacle if present, etc. Therefore, in the robot control system according to this embodiment, the amount of information obtainable from an image captured by the photographing device that photographs the blind area is not increased in this case to thereby relieve the load involved in image analysis.

Thus, the robot control system according to this embodiment can efficiently control the mobile robot without increasing the load involved in image analysis.

The present disclosure is not limited to the above-described embodiments but can be changed as necessary within a range that does not depart from the gist of the disclosure. For example, a combination of some components of Embodiments 1 and 2 is also included in the scope of the technical idea of the embodiments. Further, an autonomous motion method and an autonomous motion program to be shown below are also included in the scope of the technical idea of the embodiments.

Moreover, in this disclosure, some or all of the processes executed in the mobile robot 100 and the server device 300 may be realized by causing a central processing unit (CPU) to execute a computer program.

This program can be stored using various types of non-transitory computer-readable media and supplied to a computer. These non-transitory computer-readable media include various types of tangible storage media. Examples of non-transitory computer-readable media include a magnetic recording medium, a magneto-optical recording medium, a compact disc read-only memory (CD-ROM), a CD-R, a CD-R/W, and a semiconductor memory. Examples of magnetic recording media include a flexible disc, a magnetic tape, and a hard disk drive. One example of magneto-optical recording media is a magneto-optical disc. Examples of semiconductor memories include a mask ROM, a programmable ROM (PROM), an erasable PROM (EPROM), a flash ROM, and a random-access memory (RAM). Further, the program may be supplied to a computer by various types of transitory computer-readable media. Examples of transitory computer-readable media include electrical signals, optical signals, and electromagnetic waves. The transitory computer-readable medium can supply the program to a computer through a wired communication channel, such as an electric wire or an optical fiber, or a wireless communication channel.

The present disclosure is not limited to the above-described embodiments but can be changed as necessary within a scope that does not depart from the gist of the disclosure. For example, a combination of some components of Embodiments 1 and 2 is also included in the scope of the technical idea of the embodiments. In addition, a robot control method and a control program to be shown below are also included in the scope of the technical idea of the embodiments.

Additional Statement 1

A robot control method including the steps of:
monitoring whether a mobile robot that moves autonomously inside a facility has entered a predetermined area corresponding to a blind area located at a blind angle to the mobile robot;
upon detection of entry of the mobile robot into the predetermined area, increasing the amount of information obtainable from an image captured by a photographing device that photographs the blind area; and
controlling the operation of the mobile robot based on the image captured by the photographing device.

Additional Statement 2

The robot control method according to Additional Statement 1, wherein, in the step of increasing the amount of information obtainable from the image captured by the photographing device, when entry of the mobile robot into the predetermined area is detected, at least one of the frame rate, the resolution, and the shooting range of photographing by the photographing device is increased.

Additional Statement 3

The robot control method according to Additional Statement 1 or 2, wherein, in the step of controlling the operation of the mobile robot, when an obstacle in the blind area is detected from the image captured by the photographing device, the moving speed of the mobile robot is reduced to a speed corresponding to the obstacle.

Additional Statement 4

The robot control method according to any one of Additional Statements 1 to 3, wherein the photographing device is a camera that is installed inside the facility.

Additional Statement 5

The robot control method according to any one of Additional Statements 1 to 3, wherein the photographing device is a camera that is mounted on a mobile robot other than the mobile robot.

Additional Statement 6

The robot control method according to any one of Additional Statements 1 to 5, wherein, when the mobile robot moves from a first passage into a second passage via a corner or an intersection, the predetermined area is an area of the first passage that is adjacent to the corner or the intersection, and the blind area is an area of the second passage that is adjacent to the corner or the intersection.

Additional Statement 7

A control program that causes a computer to execute:
a process of monitoring whether a mobile robot that moves autonomously inside a facility has entered a predetermined area corresponding to a blind area located at a blind angle to the mobile robot;
a process of, upon detection of entry of the mobile robot into the predetermined area, increasing the amount of information obtainable from an image captured by a photographing device that photographs the blind area; and
a process of controlling the operation of the mobile robot based on the image captured by the photographing device.

Additional Statement 8

The control program according to Additional Statement 7, wherein, in the process of increasing the amount of information obtainable from the image captured by the photographing device, when entry of the mobile robot into the predetermined area is detected, at least one of the frame rate, the resolution, and the shooting range of photographing by the photographing device is increased.

Additional Statement 9

The control program according to Additional Statement 7 or 8, wherein, in the process of controlling the operation of the mobile robot, when an obstacle in the blind area is detected from the image captured by the photographing device, the moving speed of the mobile robot is reduced to a speed corresponding to the obstacle.

Additional Statement 10

The control program according to any one of Additional Statements 7 to 9, wherein the photographing device is a camera that is installed inside the facility.

Additional Statement 11

The control program according to any one of Additional Statements 7 to 9, wherein the photographing device is a camera that is mounted on a mobile robot other than the mobile robot.

Additional Statement 12

The control program according to any one of Additional Statements 7 to 11, wherein, when the mobile robot moves from a first passage into a second passage via a corner or an intersection, the predetermined area is an area of the first passage that is adjacent to the corner or the intersection, and the blind area is an area of the second passage that is adjacent to the corner or the intersection.

What is claimed is:

1. A robot control system in which operation of a mobile robot that moves autonomously inside a facility is controlled based at least on an image captured by a photographing device that photographs a blind area located at a blind angle to the mobile robot, wherein, when entry of the mobile robot into a predetermined area corresponding to the blind area is detected, an amount of information obtainable from an image captured by the photographing device is increased;
    wherein the information obtainable comprises at least a frame rate or a resolution; and
    wherein when an obstacle in the blind area is detected from an image captured by the photographing device using the increased information, a moving speed of the mobile robot is reduced to a speed corresponding to the obstacle.

2. The robot control system according to claim 1, wherein the photographing device is a camera that is installed inside the facility.

3. The robot control system according to claim 1, wherein the photographing device is a camera that is mounted on a mobile robot other than the mobile robot.

4. The robot control system according to claim 1, wherein, when the mobile robot moves from a first passage into a second passage via a corner or an intersection, the predetermined area is an area of the first passage that is adjacent to the corner or the intersection, and the blind area is an area of the second passage that is adjacent to the corner or the intersection.

5. The robot control system according to claim 1, comprising:
    the mobile robot that moves autonomously inside the facility; and
    a control device that controls the mobile robot based at least on an image captured by the photographing device that photographs the blind area located at the blind angle to the mobile robot.

6. A robot control method comprising the steps of:
    monitoring whether a mobile robot that moves autonomously inside a facility has entered a predetermined area corresponding to a blind area located at a blind angle to the mobile robot;
    upon detection of entry of the mobile robot into the predetermined area, increasing an amount of information obtainable from an image captured by a photographing device that photographs the blind area; and
    controlling operation of the mobile robot based on the image captured by the photographing device;
    wherein the information obtainable comprises at least a frame rate or a resolution; and
    wherein when an obstacle in the blind area is detected from an image captured by the photographing device using the increased information, reducing a moving speed of the mobile robot to a speed corresponding to the obstacle.

7. A non-transitory computer readable medium comprising a control program that causes a computer to execute:
    a process of monitoring whether a mobile robot that moves autonomously inside a facility has entered a predetermined area corresponding to a blind area located at a blind angle to the mobile robot;
    a process of, upon detection of entry of the mobile robot into the predetermined area, increasing an amount of information obtainable from an image captured by a photographing device that photographs the blind area; and
    a process of controlling operation of the mobile robot based on the image captured by the photographing device; and
    a process of, when an obstacle in the blind area is detected from an image captured by the photographing device using the increased information, a moving speed of the mobile robot is reduced to a speed corresponding to the obstacle;
    wherein the information obtainable comprises at least a frame rate or a resolution.

* * * * *